March 7, 1950 G. B. HILL ET AL 2,499,500
IMPLEMENT FRAME CONSTRUCTION
Filed Aug. 23, 1946 2 Sheets-Sheet 1
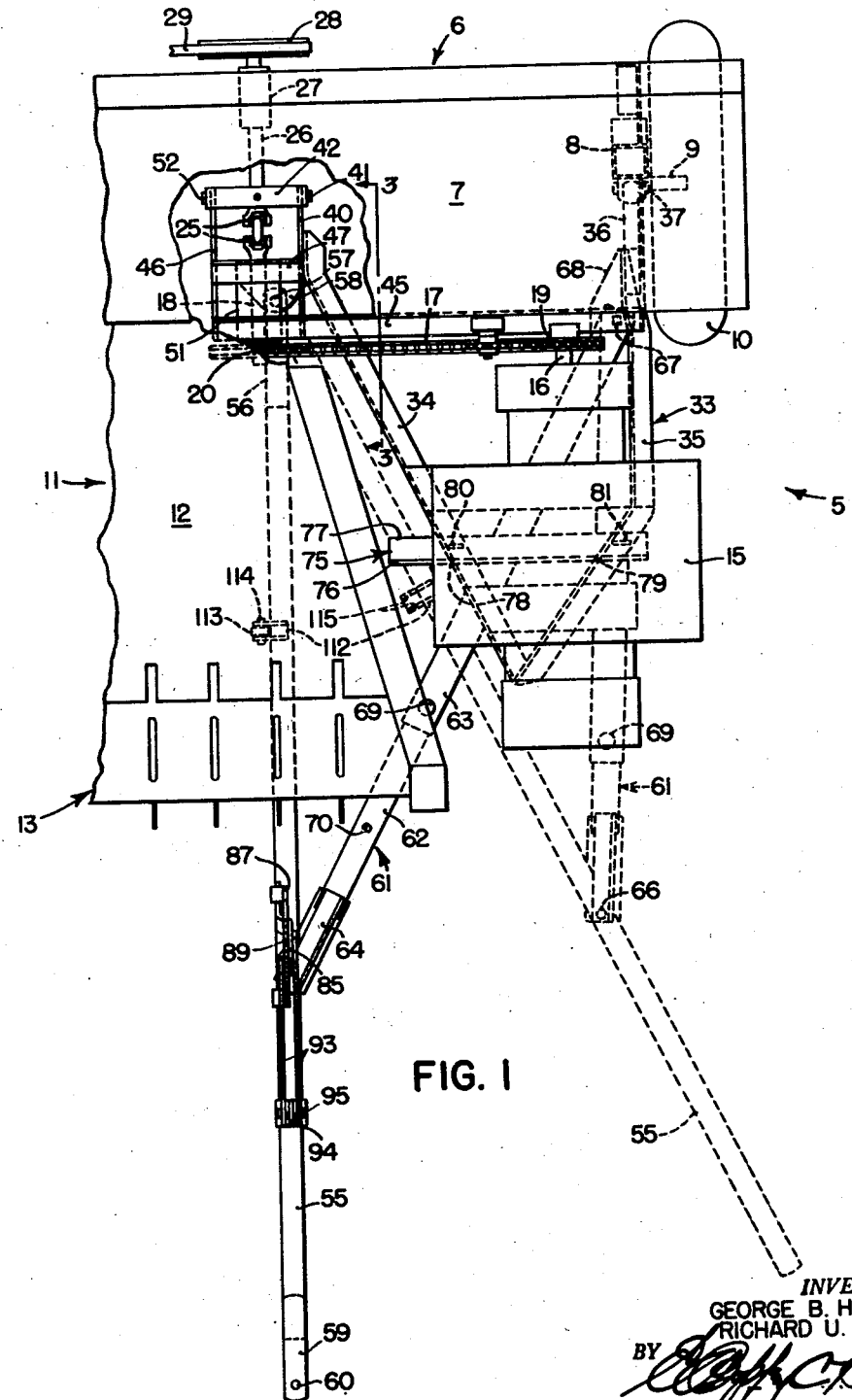
FIG. 1
INVENTORS
GEORGE B. HILL
RICHARD U. ZOLLARS
BY
ATTORNEYS.

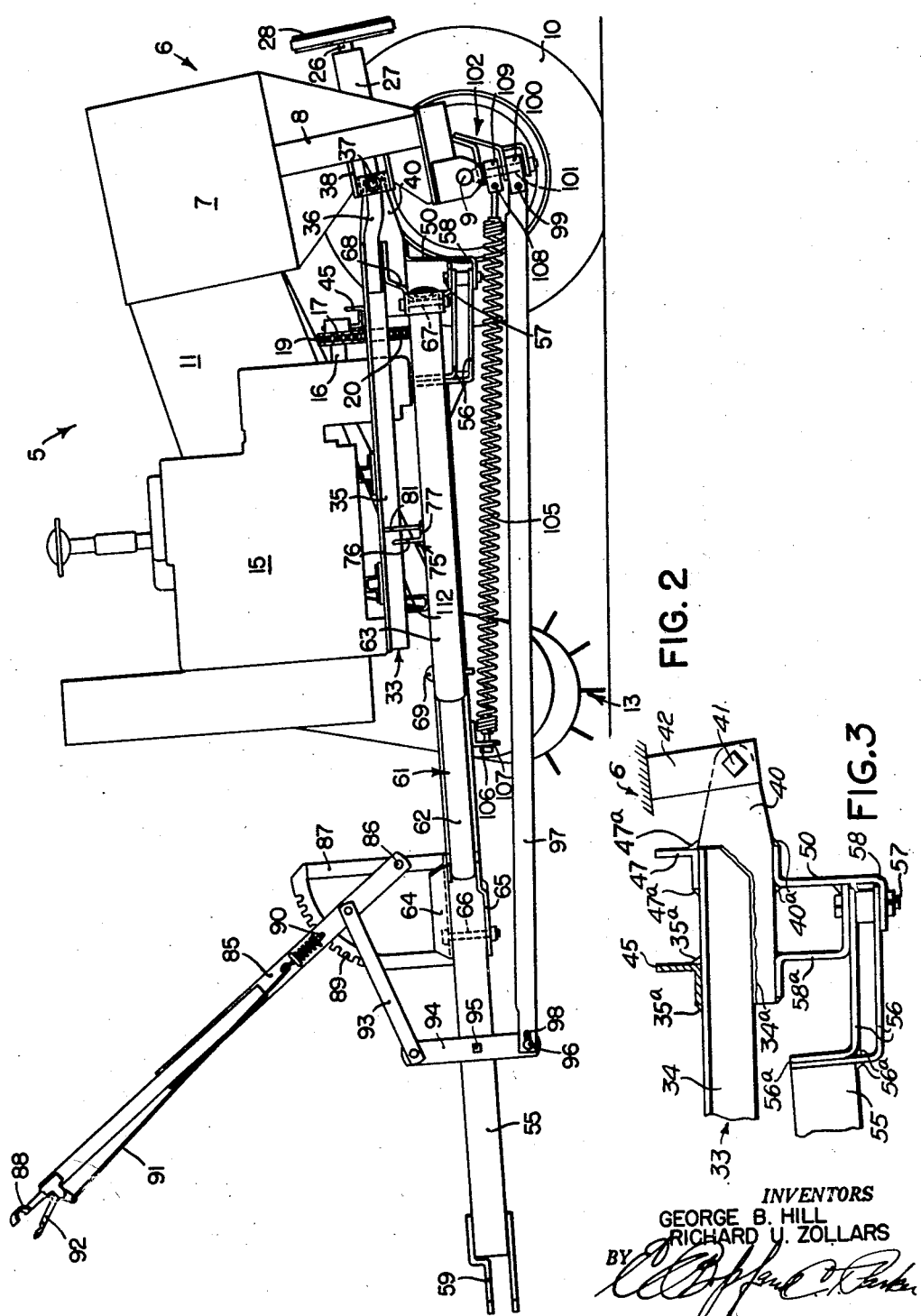

Patented Mar. 7, 1950

2,499,500

UNITED STATES PATENT OFFICE 2,499,500

IMPLEMENT FRAME CONSTRUCTION

George B. Hill and Richard U. Zollars, Ottumwa, Iowa, assignors to Deere Manufacturing Co., a corporation of Iowa Application August 23, 1946, Serial No. 692,686

9 Claims. (Cl. 56—228)

The present invention relates generally to agricultural implements and more particularly to frame construction, and has for its principal object the provision of a novel and improved implement frame which is simple and inexpensive to manufacture, but strong and durable in operation.

Certain agricultural implements, such as harvesting machines and the like, comprise a main frame carried on a pair of laterally spaced wheels and include a draft member which extends forwardly from the main frame and is adapted to be supported on its forward end on a tractor drawbar. Such harvesting machines are usually provided with a crop harvesting or gathering device which projects forwardly from the main frame and requires raising and lowering during operation in the field, to accommodate crops of different heights. In designing harvesting implements for certain purposes, it is sometimes desirable to mount the main frame and the harvesting device together as a unitary rigid structure upon a pair of laterally spaced supporting wheels, with provision for tilting the unitary structure about the axis of the wheels to raise and lower the harvesting device. In this type of machine, it is obviously necessary to connect the draft member to the main frame by means providing for swinging movement of the frame relative to the draft member, in order to provide for the vertical adjustment of the harvesting device with the forward end of the draft member connected to the drawbar of the tractor during operation.

It is also desirable to provide for swinging the draft member laterally relative to the main frame to provide for shifting the implement between an operating position in which the harvesting device is offset laterally from the tractor or draft vehicle, in order that the latter can travel alongside the crops which are being harvested by the implement, and a transport position in which the implement trails directly behind the tractor to reduce the overall width of the tractor and implement for transporting the latter along narrow roads and through narrow gates.

Implements of this general class, as are well known to those skilled in the art, are usually supplied with power for operating the harvesting and crop treating mechanism associated therewith by means of a flexible power shaft extending forwardly along the draft member and connected to the power takeoff shaft of the tractor through suitable universal joints and telescoping shaft connections, which permit the main frame structure to be tilted relative to the draft member and also permit the draft member to be swung laterally relative to the main frame structure.

However, implements of this type require a tractor of sufficient capacity to supply power not only to propel the implement but also to supply sufficient power through the power takeoff shaft to operate the crop handling mechanism on the implement. Hence, in order to provide an implement which can be operated by medium and small size tractors, it is often desirable to provide the implement with a power plant mounted thereon for driving the harvesting and crop treating mechanisms, in order that the full capacity of the tractor be available for propelling the implement over hills and through soft ground.

It has been difficult, in the case of the type of implement described above, to provide a suitable mounting for the power plant, for there is no part of the implement frame which does not tilt or swing relative to the ground, and the problem of mounting a heavy power plant on an implement of this type, is therefore difficult in its solution. Hence, one of the principal objects of the present invention relates to the provision of a novel and improved means for supporting a power plant upon an implement of the type hereinbefore described.

More generally, a further object relates to the provision of an auxiliary frame section which maintains a substantially stationary position on an implement in which the main frame is tiltable relative to the ground and the draft member therefor is shiftable laterally relative to the main frame.

In the accomplishment of these objects, an auxiliary frame section is swingably mounted on the tiltable main frame by means providing for relative swinging movement of the auxiliary and main frame section about an axis which is generally parallel to the axis of tilting movement of the main frame, while the other end of the auxiliary frame is slidably supported on the laterally shiftable draft member, which permits the draft member to be shifted between operating and transport positions while carrying the auxiliary frame in any of the several positions of lateral adjustment.

These and other objects and advantages of the present invention will be apparent to those skilled in the art after a consideration of the following description, in which reference is had to the drawings appended hereto, in which Figure 1 is a top plan view of a baling press of the type having windrow pickup mechanism for picking up and baling a windrow of crops in the field, the harvester being illustrated in solid lines in its transport position, and showing in dotted lines the position of the draft member during normal operation;

Figure 2 is a side elevational view of the implement in normal operating position, but with the near wheel removed to more clearly show the details of construction; and Figure 3 is a fragmentary enlarged view, partly in section, as viewed generally along the line 3—3 of Figure 1.

Referring now to the drawings, the baling press, indicated generally by reference numeral 5, comprises a main frame 6 including a transversely disposed bale case 7 mounted on depending legs or standards 8, on which are mounted a pair of coaxially disposed laterally spaced stub axles 9 on which are journaled a pair of supporting wheels 10. A harvesting device 11 comprises a platform 12 extending forwardly from the transverse bale case 7 in offset relation toward one end of the latter and is rigidly fixed thereto. The forward end of the platform 12 carries a pickup device 13 disposed beneath the forward end of the platform and substantially coextensive with the forward edge thereof. Inasmuch as the details of construction of the bale case, platform, and pickup mechanism do not form an essential part of the present invention, they are illustrated more or less diagrammatically and a detailed description thereof is not considered necessary for present purposes. It is sufficient to state however that inasmuch as the platform 12 and main frame 6 are rigidly secured together in a single unitary frame structure, the latter may be tilted fore and aft about the transverse axis of the wheels 10 to raise and lower the forward end of the platform 12 and the pickup mechanism 13 to adjust the clearance of the latter above the ground during normal operation and during transport. Furthermore, it is to be understood that our invention is not limited to a crop baling machine, for the principles of the present invention may be applied advantageously to other types of implements, such as, for example, corn harvesting machines.

Power is supplied to operate the baling and harvesting mechanism (not shown) by means of a power plant 15 in the form of a conventional internal combustion engine, disposed alongside the platform 12 and ahead of the inner end of the main frame 6. The engine 15 has an output shaft 16, which is connected by a power transmitting chain 17 to a power shaft 18 disposed with its axis of rotation parallel to the axis of the output shaft 16, the chain 17 being trained over a pair of sprockets 19, 20 fixed to the shafts 16, 18, respectively. The shaft 18 is connected through a pair of universal joints 25 to a drive shaft 26 journaled in a bearing 27 mounted rigidly on the main frame beneath the bale case 7. The drive shaft 26 carries a pulley 28 which is connected by a power transmitting belt 29 to the mechanism (not shown) on the implement.

The power plant 15 is supported on an auxiliary frame 33, substantially of V-shape, comprising a pair of structural angle members 34, 35 extending forwardly in converging relation from the main frame 6 and disposed in a generally horizontal plane. The rear end of one of the auxiliary frame members 35 is provided with a leg 36 rigidly welded thereto, which is pivotally connected by a transverse pivot pin 37 to a bracket 38 mounted on the forward side of the adjacent standard 8 of the main frame 6. The other frame member 34 is rigidly fixed, as by welding at 34a (Figure 3), to a leg 40, which is pivotally connected by a pivot bolt 41 to a bracket 42, which is rigidly mounted on the main frame 6 beneath the bale case 7. The pivot bolts or pins 37, 41 are disposed coaxially on a transversely extending generally horizontal axis, thereby providing for vertical swinging movement of the forward converging portion of the auxiliary frame 33 relative to the main frame 6 about said axis.

The two frame members 34, 35 are interconnected ahead of the bale case 7 by a transversely extending structural angle member 45, which is secured to the frame members 34, 35 as by welding at 35a (Figure 3) and which extends beyond the member 34 and is also connected to the forward portion of the leg 40 and also to a plate 46 disposed substantially parallel to the fore and aft extending leg 40 and connected to the latter by another structural angle member 47 spaced rearwardly of and parallel to the member 45 and preferably welded at 47a to the members 34 and 35 (Figure 3). The lower edges of the leg 40 and plate 46 are interconnected by means of being welded at 40a to a depending bracket 50 (Figure 3) which, with the members 40, 46, 47, 45 forms a framework within which is mounted a bearing 51, within which is journaled the shaft 18. Thus, the plate 46 extends rearwardly and is pivotally connected to the bracket 42 by a pivot pin 52 disposed coaxially with the pivot pins 37 and 41.

Thus, it is evident that the auxiliary frame 33 which supports the power plant 15, together with the bearing 51 supporting the power shaft 18 is pivotally mounted at the rear end of the main frame 6 for vertical swinging movement about the coaxial pivots 37, 41, 52, relative to the main frame.

The implement is connected to a draft vehicle, such as a tractor, by means of a tubular draft tongue 55 of rectangular cross section, the rear end of which is mounted on a pair of L-shaped brackets 56, preferably by welding at 56a, which are offset downwardly below the axis of the tongue 55 and are pivotally connected by a generally vertical pivot bolt 57 to the lower bracket 50 and to an extension 58 of the latter which depends therefrom and to a reenforcing Z-shaped piece 58a welded in place as shown in Figure 3. The tongue 55 extends forwardly from the pivotal connecting bolt 57 and is swingable laterally in a generally horizontal plane between a transport position shown in solid lines in Figure 1, in which the draft tongue is substantially parallel to the direction of travel of the implement, and a working position, in which the tongue is inclined forwardly and laterally away from the harvester platform 12, as indicated in dotted lines in Figure 1. In the transport position, the harvester platform must be raised to a height sufficient to clear the tongue 55, as will be explained later. The forward end of the tongue is provided with a hitch device 59 provided with an aperture 60 to receive a coupling pin for coupling the draft tongue to the drawbar of a tractor in a conventional manner and for supporting the forward end of the tongue on the drawbar.

An extensible bracing member 61 is connected between the auxiliary frame and the tongue 55 and comprises a pair of telescoping tubular members 62, 63. The forward end of the telescoping section 62 is provided with a pair of upper and lower connecting members 64, 65, preferably welded thereto, and which receive therebetween the draft tongue 55 and are pivotally connected to the latter by means of a vertical pivot bolt 66. The rear end of the rear telescoping section 63 is pivotally connected by a bolt 67 to a bracket 68, which is welded to the rear portion of the auxiliary frame 33 and depends therefrom. The two telescoping sections 62, 63 are secured rigidly together by means of a coupling pin 69, which is inserted substantially vertically through a pair of aligned apertures in the two sections 62, 63 in a transport position and through other aligned apertures 70 in operating position. Thus, to adjust the draft tongue 55 between operating and transport positions, the bolt 69 must first be removed to permit the brace 61 to be extended or contracted. After the tongue has been laterally adjusted, the pin 69 is replaced in another pair of aligned apertures to hold the brace 61 rigidly.

The auxiliary frame 33 includes a transversely disposed structural angle member 75 including a vertical flange 76 and a horizontal flange 77. The vertical flange 76 is notched at 78 and 79 to receive the vertical flange portions of the forwardly converging angle members 34, 35 of the auxiliary frame 33, and the transverse member 75 is rigidly welded to the members 34, 35. The horizontal flange 77 is connected by bracing plates 80, 81 with the horizontal frame members 34, 35, respectively. Thus, the angle member 75 is a rigid part of the auxiliary frame 33 and constitutes a support for the forward end of the latter upon the draft members 55, 61, upon which it slidably bears. It will be noted in Figure 1 that when the draft members are in their working position, as indicated in dotted lines, the horizontal flange 77 of the transverse angle member 75 spans between the tongue 55 and telescoping brace 61 and bears on top of both of the draft members. However, when the draft members are shifted laterally to transport position, as indicated by solid lines, the tongue 55 swings inwardly from the inner end of the angle member 75, but the latter still bears upon the top of the rear tubular member 63 of the brace 61.

The main frame 6 can be tilted fore and aft about its supporting axles 9 to raise and lower the harvester platform 12 by means of a control lever 85, which is pivotally mounted by means of a bolt 86 on an upstanding bracket 87, which is rigidly secured to the draft tongue 55 near the forward end thereof. The control lever 85 extends forwardly and upwardly and is provided with a handle 88 which is disposed within reach of the tractor operator. The bracket 87 is provided with a notched sector 89 engageable by a latch 90, which is mounted on the side of the lever and connected by a link 91 to a latch operating lever 92 pivoted on the handle 88. The control lever 85 is connected by means of a forwardly extending link 93 to the upper end of a bifurcated lever 94, which straddles the draft tongue 55 and is pivotally connected thereto by a transversely extending pivot bolt 95, intermediate the ends of the lever 94. The lower end of the lever 94 is connected by a pivot bolt 96 to a rearwardly extending link 97 provided with a fore and aft extending slot 98 through which the pivot bolt 96 extends. The link 97 extends rearwardly beneath the tongue 55 and is connected by a transverse pivot bolt 99 to a collar 100, the latter being pivotally mounted by means of a generally vertical pivot bolt 101 on a bracket 102 rigidly fixed to the main frame 6 beneath the bale case 7.

Thus it is evident that by raising the handle 88 of the control lever 85, the pivoted lever 94 is shifted angularly in a clockwise direction, thereby pulling forwardly on the link 97 which is connected to a low point on the main frame. The reaction of this force exerted upon the control lever 85 acts rearwardly through the draft tongue 55, the vertical pivot bolt 67, the auxiliary frame 33 and the transverse pivot members 37, 41, 52, the axis of which is spaced appreciably higher than the point of connection of the link 97, thus resulting in a force couple, tending to tilt the main frame 6 rearwardly to raise the platform 12.

To facilitate raising the platform 12, a counterbalancing spring 105 is provided beneath the draft tongue 55. The forward end of the spring 105 is connected by a bolt 106 to a depending lug 107 rigidly secured to the bottom of the tongue 55. The rear end of the counterbalancing spring 105 is pivotally connected at 108 on a transverse axis to a collar 109 which is journaled on the vertical pivot pin 101. The spring 105 acts in tension tending to raise the platform, and may be adjusted by means of the bolt 106 to increase or decrease the amount of tensional force applied between the main frame and the draft tongue.

It will now be evident that the draft members 55, 61 are connected to the main frame 6 by means providing for both lateral swinging movement about a vertical axis and vertical swinging movement about a transverse axis relative thereto. However, the power plant 15 is maintained in a substantially horizontal position by virtue of its supporting frame 33, which is pivotally mounted on the main frame on the transverse axis of the pivots 37, 41, 52, thereby permitting the main frame to tilt without greatly affecting the auxiliary frame 33. The forward end of the latter is supported on the transverse angle member 75 which slidably bears upon the draft members 55, 61, permitting the latter to shift laterally relative to the auxiliary frame 33 while supporting the latter on the tractor drawbar in any laterally adjusted position of the draft members.

To condition the implement for transport, the control lever 85 is raised to raise the platform 12 and pickup device 13 above the height of the draft tongue 55, after which the pin 69 is withdrawn from the telescoping brace members and the tongue is then swung laterally about its pivot 67, thereby extending the brace 61. A U-shaped bracket 112 is welded to the top of the draft tongue 55 and swings under the platform to straddle a depending lug 113 on the bottom of the platform 12. A bolt 114 can then be inserted through aligned apertures 115 in the U-shaped bracket 112 and an aperture in the lug 113, thus securing the platform to the draft member 55 for transport purposes. In this position of the draft tongue, the pin 69 is inserted through aligned apertures in the telescoping members 62, 63 to hold the tongue 55 rigidly in forwardly extending position.

We claim:

1. In an implement comprising a main wheeled frame, an auxiliary frame pivotally connected thereto by means providing for generally vertical swinging movement about an axis disposed transverse to the direction of forward travel, and a draft member pivotally connected to said auxiliary frame by means providing for lateral swinging movement relative thereto between operating and transport positions and extending forwardly beneath said auxiliary frame, said auxiliary frame having a transverse beam slidably bearing upon said draft member to transmit substantially the same portion of the weight of said frame thereto in any position of the latter within its normal range of lateral movement.

2. An implement comprising a main frame, a pair of laterally spaced wheels journaled thereon, a draft member extending forwardly from and swingably connected with said frame by means providing for lateral shifting movement relative thereto between operating and transport positions and also providing for tilting movement of said frame relative to said draft member about a transverse axis, and an auxiliary frame connected with said main frame by means providing for vertical swinging movement about a transverse axis, said auxiliary frame having a part extending over said draft member and having a frame element slidably bearing on said member at all times to support said auxiliary frame thereon in laterally adjusted positions of said draft member.

3. A harvesting implement comprising a main frame including a forwardly extending harvesting device rigid therewith, a pair of laterally spaced wheels journaled on said frame providing for fore and aft tilting movement to raise and lower said harvesting device, a draft member extending forwardly from and swingably connected with said frame by means providing for lateral shifting movement relative thereto between operating and transport positions and also providing for said fore and aft tilting movement of said frame relative to said draft member, means connected between said frame and member for adjustably fixing the same together in tilted positions, and an auxiliary frame connected with said main frame by means providing for vertical swinging movement about a transverse axis, said auxiliary frame extending over said draft member and having a frame element slidably bearing on said member to support said auxiliary frame thereon in a generally level position in several laterally adjusted positions of said draft member and in several tilted positions of said main frame.

4. An implement comprising a main frame, a pair of laterally spaced wheels journaled thereon, an auxiliary frame extending forwardly from said main frame and pivotally mounted thereon by means providing for vertical swinging movement relative thereto about a transverse axis, a draft member extending beneath said auxiliary frame, means pivotally mounting said draft member on said auxiliary frame by means providing for lateral swinging movement of the draft member relative the auxiliary frame, said transverse pivotal frame mounting providing for fore and aft tilting movement of said main frame relative to said draft member, and adjustable means for securing said main frame to said draft member in several tilted positions, said auxiliary frame being slidably carried on said draft member in any of a plurality of laterally adjusted positions of the latter.

5. A harvesting implement comprising a main frame including a forwardly extending harvesting device rigid therewith, a pair of laterally spaced wheels journaled on said frame providing for fore and aft tilting movement to raise and lower said harvesting device, an auxiliary frame extending forwardly from said main frame and pivotally mounted thereon by means providing for vertical swinging movement relative thereto about a transverse axis, a draft member extending beneath said auxiliary frame, means pivotally mounting said draft member on said auxiliary frame by means providing for lateral swinging movement relative thereto, a lever connected between said draft member and said main frame and shiftable to tilt the latter relative to the former to raise and lower said harvesting device, said lever being securable in adjusted position, a portion of said auxiliary frame slidably bearing upon said draft member to transfer a portion of the weight on said frame to said draft member but permitting the latter to slide laterally relative to said auxiliary frame between operating and transport positions.

6. An implement comprising a main frame, a pair of laterally spaced supporting wheels journaled thereon, an auxiliary frame extending forwardly from said main frame, means pivotally mounting the rear end of said auxiliary frame on said main frame for vertical swinging movement about an axis spaced above and parallel to the axis of said supporting wheels, a draft member extending beneath said auxiliary frame, means pivotally mounting the rear end of said draft member on one of said frames by means providing for lateral swinging movement relative thereto, and a transverse rail secured to said auxiliary frame and slidably bearing upon said draft member for supporting the former upon the latter in any of a plurality of laterally adjusted positions of said member.

7. A harvesting implement comprising a main frame including a forwardly extending harvesting device rigid therewith, a pair of laterally spaced wheels journaled on said frame providing for fore and aft tilting movement to raise and lower said harvesting device, a power plant for said implement, an auxiliary frame for carrying said power plant extending forwardly from said main frame, means pivotally mounting the rear end of said auxiliary frame on said main frame for vertical swinging movement about an axis spaced above and parallel to the axis of said supporting wheels, a draft member extending rearwardly beneath said auxiliary frame, means pivotally mounting the rear end of said draft member on said auxiliary frame by means providing for lateral swinging movement relative thereto, a lever connected between said draft member and said main frame and shiftable to tilt the latter relative to the former to raise and lower said harvesting device, said lever being securable in adjusted position, a portion of said auxiliary frame slidably bearing upon said draft member to transfer a portion of the weight on said frame to said draft member but permitting the latter to slide laterally relative to said auxiliary frame between operating and transport positions.

8. In combination with a wheeled frame: a draft member connected with the wheeled frame by means providing for horizontal lateral movement of the draft member between first and second positions relative to the wheeled frame; and an auxiliary frame having spaced apart mounting portions, one of which is connected to the wheeled frame for supporting part of the weight of the auxiliary frame on the wheeled frame, the other mounting portion of said auxiliary frame including a member slidably bearing upon the draft member in either the first or second position of the draft member and also during the normal range of movement of the draft member between said positions, for supporting the remainder of the weight of the auxiliary frame on the draft member at all times.

9. In combination: a wheeled frame; an auxiliary frame having spaced apart mounting portions, one of which is connected to the wheeled frame for supporting part of the weight of the auxiliary frame on the wheeled frame; and a draft member connected to one of said frames for horizontal lateral swinging relative to said frames between first and second positions and extending in both positions beneath the auxiliary frame, said draft member and the other of said auxiliary frame mounting portions comprising relatively slidable elements bearing one upon the other for supporting the remainder of the weight of the auxiliary frame on the draft member in either position of the draft member.

GEORGE B. HILL.
RICHARD U. ZOLLARS.

REFERENCES CITED

The following references are of record in the file of this patent:

UNITED STATES PATENTS

| Number | Name | Date |
|---|---|---|
| 685,944 | Pridmore | Nov. 5, 1901 |
| 1,848,359 | Krause | Mar. 8, 1932 |
| 1,940,851 | Everett et al. | Dec. 26, 1933 |
| 2,332,006 | Oehler | Oct. 19, 1943 |
| 2,391,018 | Harrer | Dec. 18, 1945 |
| 2,429,492 | Scranton | Oct. 21, 1947 |